US008835741B2

(12) United States Patent
Zhonggang

(10) Patent No.: US 8,835,741 B2
(45) Date of Patent: Sep. 16, 2014

(54) METHOD AND SYSTEM FOR TURNING PAGES CONTAINING MUSICAL SCORES WITH AN ELECTRONIC FOOT PEDAL

(71) Applicant: Zhang Zhonggang, Dubai (AE)

(72) Inventor: Zhang Zhonggang, Dubai (AE)

( * ) Notice: Subject to any disclaimer, the term of this patent is extended or adjusted under 35 U.S.C. 154(b) by 0 days.

(21) Appl. No.: 13/761,582

(22) Filed: Feb. 7, 2013

(65) Prior Publication Data

US 2014/0216233 A1 Aug. 7, 2014

Related U.S. Application Data

(60) Provisional application No. 61/660,828, filed on Jun. 18, 2012.

(51) Int. Cl.
*G10H 1/32* (2006.01)
*G10H 3/00* (2006.01)
*G10G 7/00* (2006.01)

(52) U.S. Cl.
CPC .................................... *G10G 7/00* (2013.01)
USPC ........................................ 84/746; 84/483.1

(58) Field of Classification Search
USPC ............................................. 84/746, 483.1
See application file for complete search history.

(56) References Cited

U.S. PATENT DOCUMENTS

| | | | | |
|---|---|---|---|---|
| 5,760,323 | A * | 6/1998 | Romero et al. | 84/470 R |
| 6,084,168 | A * | 7/2000 | Sitrick | 84/477 R |
| 6,348,648 | B1 * | 2/2002 | Connick, Jr. | 84/477 R |
| 6,635,815 | B2 * | 10/2003 | Kosakaya et al. | 84/471 R |
| 7,119,266 | B1 * | 10/2006 | Bittner et al. | 84/477 R |
| 7,649,134 | B2 * | 1/2010 | Kashioka | 84/600 |
| 7,754,955 | B2 * | 7/2010 | Egan | 84/600 |
| 7,919,705 | B2 * | 4/2011 | Miller | 84/616 |
| 8,552,281 | B1 * | 10/2013 | Cotrone | 84/477 R |
| 2001/0022127 | A1 * | 9/2001 | Chiurazzi et al. | 84/47 |
| 2007/0132718 | A1 * | 6/2007 | Li et al. | 345/156 |
| 2008/0060500 | A1 * | 3/2008 | La et al. | 84/486 |
| 2008/0060507 | A1 * | 3/2008 | Welchering | 84/645 |
| 2008/0129683 | A1 * | 6/2008 | Li | 345/156 |
| 2008/0229914 | A1 * | 9/2008 | Nathanial | 84/644 |
| 2011/0203442 | A1 * | 8/2011 | Raveendran | 84/483.1 |
| 2012/0125180 | A1 * | 5/2012 | Shim | 84/666 |

* cited by examiner

*Primary Examiner* — Jeffery Donels
(74) *Attorney, Agent, or Firm* — Barry Choobin; Patent 360 LLC

(57) ABSTRACT

The various embodiments herein provide an electronic foot pedal assembly for turning pages of musical scores in a digital musical score file in a computing device. The method comprises installing a driver application for an electronic foot pedal in a computing device, installing an image viewer application in the computing device, downloading and installing a digital musical score on the computing device, opening the installed digital musical score file in the computing device, stamping the left foot pedal for opening a previous page of musical scores in a digital musical score file, stamping the right foot pedal for opening a next page of musical scores in a digital musical score file and stamping the left foot pedal continuously for opening a home page of musical scores in a digital musical score.

3 Claims, 7 Drawing Sheets

METHOD AND SYSTEM FOR TURNING PAGES CONTAINING MUSICAL SCORES WITH AN ELECTRONIC FOOT PEDAL

CLAIM OF PRIORITY

This application claims the benefit of U.S. Provisional Patent Application 61/660,828 entitled "Electronic Foot Pedal," filed Jun. 18, 2012, the entire contents of which are incorporated herein by reference.

BACKGROUND

1. Technical Field

The embodiments herein generally relate to an electronic device and particularly relate to an electronic assisting device for the musical instruments. The present invention more particularly relates to a manually controllable electronic foot pedal for turning pages containing the musical scores/notes.

2. Description of the Related Art

A musical file is a collection of pages containing a plurality of musical notes. The musical notes help a musician to play a rhythm or a song or a ballad. The musical notes also comprise a plurality of musical scores which defines a level of the notes. The present day musicians use paper for denoting or mentioning the musical notes. The musicians turn the pages of the musical notes with their hands while playing the music.

One of the prior arts discloses an apparatus and a method for turning the pages of a musical file. The prior art provides a display which can be connected to a musical device. The display is provided with a memory to store a musical file in an electronic form. The display is further attached to a keypad provided with a plurality of keys for turning the pages of a musical file.

However, with the use of the present day prior art devices, a musician have to use ones hands to press the keys provided in the apparatus for turning the pages of the musical file. The turning of a page with the hands interrupts a flow of music while playing a musical note.

In the view of the foregoing description, there is a need for a hands free device to assist a musician in turning the pages containing musical scores/notes without getting interrupted while playing music.

The abovementioned shortcomings, disadvantages and problems are addressed herein and which will be understood by reading and studying the following specification.

OBJECTS OF THE EMBODIMENTS HEREIN

The primary object of the embodiments herein is to provide an electronic foot pedal for turning the pages containing a plurality of musical scores/notes in a computing device.

Another object of the embodiments herein is to provide a method for connecting the electronic foot pedal and the computing device through a cable.

Yet another object of the embodiments herein is to provide a method for connecting the electronic foot pedal wirelessly with the computing device.

These and other objects and advantages of the embodiments herein will become readily apparent from the following detailed description taken in conjunction with the accompanying drawings.

SUMMARY

The various embodiments herein provide an electronic foot pedal assembly for the musical instrument players for turning the pages in the digital musical scores files in a computing device. The electronic foot pedal comprises a right foot pedal, a left foot pedal, a universal serial bus (USB) socket, a battery panel, a power switch, at-least two battery power indicators and an infrared remote control system.

According to an embodiment herein, the left foot pedal is stamped to open a previous page of the musical scores in a digital musical scores file displayed on a computing device. The right foot pedal is stamped to open a next page of musical scores in the digital musical scores file displayed on the computing device. A universal serial bus (USB) socket is provided in the electronic foot pedal for connecting the electronic foot pedal with the computing device in a wired or wireless manner.

According to an embodiment herein, a microchip is provided in the electronic foot pedal for generating and transmitting a command signal to the computing device based on an operation of the left foot pedal and the right foot pedal to turn a page of the musical scores in the digital musical scores file displayed on a computing device. The microchip is connected to the left foot pedal and the right foot pedal. The microchip encodes a command signal which is generated based on an operation of the left foot pedal and the right foot pedal. The generated command signal is encoded and transmitted to the computing device through the universal serial bus (USB).

According to an embodiment herein, an electronic foot pedal driver software is pre-installed in the computing device for enabling an electronic communication between an electronic foot pedal assembly and the computing device. The computing device is installed with an image viewer software for turning the page of musical scores in the digital musical scores file based on a received command signal from the microchip.

According to an embodiment herein, the electronic foot pedal assembly is connected to the computing device through a cable.

According to an embodiment herein, the electronic foot pedal assembly is connected to the computing device through a wireless transceiver module and an infra red remote control system.

According to an embodiment herein, an infrared remote control system is communicatively coupled to the micro chip through the USB socket to transmit the command signal to the computing device.

According to an embodiment herein, a wireless transceiver module is communicatively coupled to the computing device to receive the command signal from the micro chip.

According to an embodiment herein, the wireless transceiver module is any one of an Infrared, Bluetooth and Wi-Fi devices.

According to an embodiment herein, the computing device is at-least one of a laptop, a Personal Computer, a Tablet, a Notebook, a Smart Phone, etc.

According to an embodiment herein, the digital musical score file is downloaded and installed on the computing device.

According to an embodiment herein, the computing device supplies an electrical power, when the assembly is connected to the computing device in a wired manner.

According to an embodiment herein, the electronic foot pedal comprises a battery panel for supplying an electrical power, when the assembly is connected to the computing device in a wireless manner.

According to an embodiment herein, the electronic foot pedal comprises at-least one indicator to show a residual battery power condition. The electronic foot pedal also comprises a power switch to turn ON or OFF the battery power supply.

According to an embodiment herein, the image viewer application reads an image file format in the digital score file. The digital image file has a format selected from a group consisting of an Overture (OVE) file, a Joint Photographic format (JPG) file, a Tagged Image File (TIF) file, a Graphics Interchange Format (GIF) file, a Portable Network Graphics Format (PNG) file and a Camera RAW file.

The various embodiments herein provide a method for turning the pages of the musical scores in a digital musical score file in a computing device using an electronic foot pedal assembly. The method comprises the steps of installing a driver application for an electronic foot pedal in a computing device, installing an image viewer application in the computing device, downloading and installing a digital musical score on the computing device, opening the installed digital musical score file in the computing device, stamping the left foot pedal for opening a previous page of musical scores in a digital musical score file, stamping the right foot pedal for opening a next page of musical scores in a digital musical score file and stamping the left foot pedal continuously for opening a home page of musical scores in a digital musical score.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The other objects, features and advantages will occur to those skilled in the art from the following description of the preferred embodiment and the accompanying drawings in which.

Figure 1A:
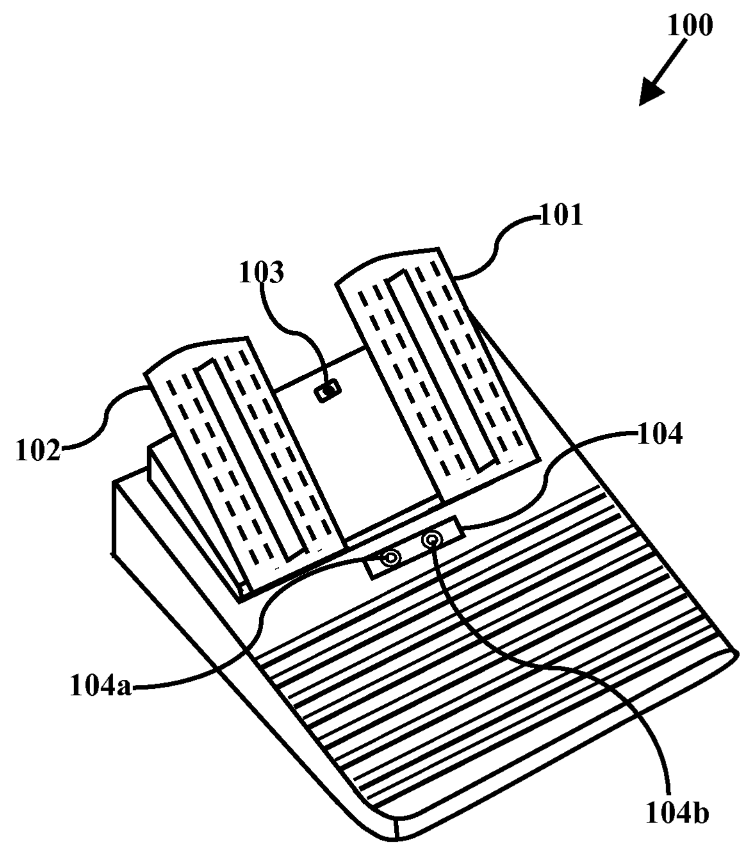
FIG. 1A illustrates a front perspective view of an electronic foot pedal assembly, according to an embodiment herein.

Although the specific features of the embodiments herein are shown in some drawings and not in others. This is done for convenience only as each feature may be combined with any or all of the other features in accordance with the embodiments herein.

DETAILED DESCRIPTION OF THE EMBODIMENTS HEREIN

In the following detailed description, a reference is made to the accompanying drawings that form a part hereof, and in which the specific embodiments that may be practiced is shown by way of illustration. These embodiments are described in sufficient detail to enable those skilled in the art to practice the embodiments and it is to be understood that the logical, mechanical and other changes may be made without departing from the scope of the embodiments. The following detailed description is therefore not to be taken in a limiting sense.

The various embodiments herein provide an electronic foot pedal assembly for the musical instrument players for turning the pages in the digital musical scores files in a computing device. The electronic foot pedal assembly comprises a right foot pedal, a left foot pedal, a universal serial bus (USB) socket, a battery panel, a power switch, at-least two battery power indicators and an infrared remote control system.

According to an embodiment herein, the left foot pedal is stamped to open a previous page of the musical scores in a digital musical scores file displayed on a computing device. The right foot pedal is stamped to open a next page of the musical scores in the digital musical scores file displayed on the computing device. A universal serial bus (USB) socket is provided in the electronic foot pedal assembly for connecting the electronic foot pedal assembly with the computing device in a wired or wireless manner.

According to an embodiment herein, a microchip is provided in the electronic foot pedal assembly for generating and transmitting a command signal to the computing device based on an operation of the left foot pedal and the right foot pedal to turn a page of the musical scores in the digital musical scores file displayed on a computing device. The microchip is connected to the left foot pedal and the right foot pedal. The microchip encodes a command signal generated based on an operation of the left foot pedal and the right foot pedal. The generated command signal is encoded and transmitted to the computing device through the universal serial bus (USB).

According to an embodiment herein, an electronic foot pedal driver software is pre-installed in the computing device for enabling an electronic communication between the electronic foot pedal assembly and the computing device. The computing device is installed with an image viewer software for turning the page of musical scores in the digital musical scores file based on a received command signal from the microchip.

According to an embodiment herein, the electronic foot pedal assembly is connected to the computing device through a cable.

According to an embodiment herein, the electronic foot pedal assembly is connected to the computing device through a wireless transceiver module and an infra red remote control system.

According to an embodiment herein, the infrared remote control system is communicatively coupled to the micro chip through the USB socket to transmit the command signal to the computing device.

According to an embodiment herein, the wireless transceiver module is communicatively coupled to the computing device to receive the command signal from the micro chip.

According to an embodiment herein, the wireless transceiver module is any one of an Infrared, Bluetooth and Wi-Fi devices.

According to an embodiment herein, the computing device is at-least one of a laptop, a Personal Computer, a Tablet, a Notebook, a Smart Phone, etc.

According to an embodiment herein, the digital musical score file is downloaded and installed on the computing device.

According to an embodiment herein, the computing device supplies an electrical power, when the electronic foot pedal assembly is connected to the computing device in a wired manner.

According to an embodiment herein, the electronic foot pedal assembly comprises a battery panel for supplying an electrical power, when the foot pedal assembly is connected to the computing device in a wireless manner.

According to an embodiment herein, the electronic foot pedal comprises at-least one indicator to show a residual battery power condition. The electronic foot pedal assembly also comprises a power switch to turn ON or OFF the battery power supply.

According to an embodiment herein, the image viewer application reads an image file format in the digital score file. The digital image file has a format selected from a group consisting of an Overture (OVE) file, a Joint Photographic format (JPG) file, a Tagged Image File (TIF) file, a Graphics Interchange Format (GIF) file, a Portable Network Graphics Format (PNG) file and a Camera RAW file.

The various embodiments herein provide a method for turning the pages of the musical scores in a digital musical score file in a computing device using an electronic foot pedal assembly. The method comprises the steps of installing a driver application for an electronic foot pedal in a computing device, installing an image viewer application in the computing device, downloading and installing a digital musical score on the computing device, opening the installed digital musical score file in the computing device, stamping the left foot pedal for opening a previous page of musical scores in a digital musical score file, stamping the right foot pedal for opening a next page of the musical scores in a digital musical score file and stamping the left foot pedal continuously for opening a home page of the musical scores in a digital musical score.

Figure 1B:
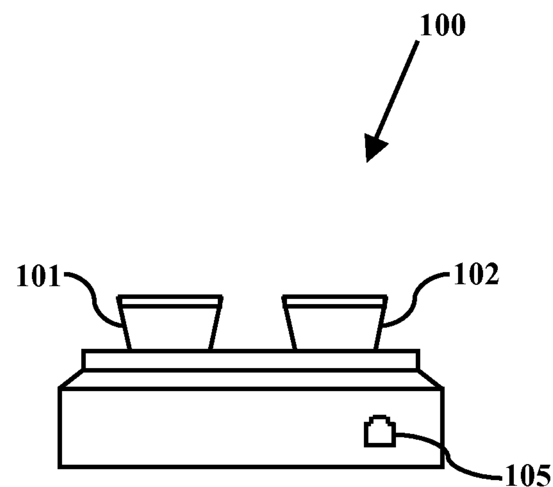
FIG. 1B illustrates a back side view of an electronic foot pedal assembly according to an embodiment herein.
Figure 1C:
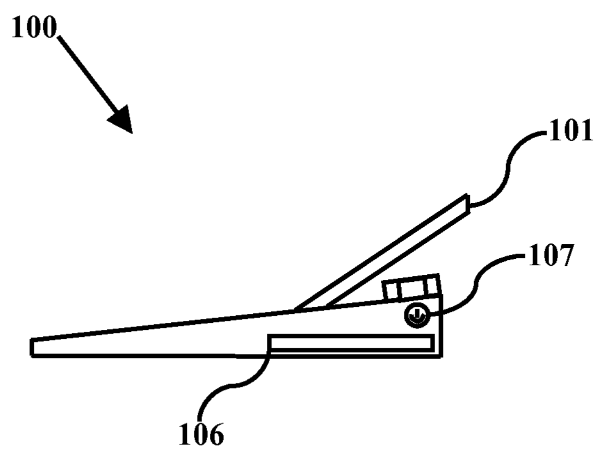
FIG. 1C illustrates a right side view of an electronic foot pedal assembly, according to an embodiment herein.

FIG. 1A illustrates a front perspective view of an electronic foot pedal assembly, while FIG. 1B illustrates a back side view of the electronic foot pedal assembly and FIG. 1C illustrates a right side view of the electronic foot pedal assembly, according to an embodiment herein. With respect to FIG. 1A-FIG. 1C, the electronic foot pedal assembly 100 for musical instrument players for turning the pages in the digital musical scores files in a computing device comprises a right foot pedal 101, a left foot pedal 102, a universal serial bus (USB) socket 105, a battery panel 106, a power switch 107, at-least two battery power indicators 104 and an infrared remote control system 103.

According to an embodiment herein, the right foot pedal 101 is integrally formed on the right side of the electronic foot pedal assembly 100 (as shown in FIG. 1A) with a built-in grip. The right foot pedal 101 is stamped for opening a next page of the musical scores/notes in the digital musical scores/notes file displayed on the computing device. Similarly, the left foot pedal 102 is integrally formed on the left side of the electronic foot pedal 100 (as shown in FIG. 1A) with a built-in grip. The left foot pedal 102 is stamped for opening a previous page containing musical scores/notes in the digital musical scores/notes file displayed on the computing device.

According to an embodiment herein, the universal serial bus (USB) socket 105 is provided on the rear side of the electronic foot pedal assembly 100 (as shown in FIG. 1B). The universal serial bus (USB) socket 105 provides a wired connection between the electronic foot pedal assembly 100 and the computing device.

According to an embodiment herein, the battery panel 106 is provided in the electronic foot pedal assembly 100 for storing an adequate electrical power. The battery panel 106 operates the foot pedals by supplying the stored power in case of wireless connection between the electronic foot pedal assembly 100 and the computing device. The battery panel 106 comprises a set of batteries which are connected in series.

According to an embodiment herein, the set of batteries are rechargeable. The computing device charges the set of batteries of the electronic foot pedal 100 when the computing device and the electronic foot pedal 100 are connected through the universal serial bus (USB) socket 105. Preferably the battery panel 106 is provided at the right side of the electronic foot pedal 100 (as shown in FIG. 1C).

According to an embodiment herein, the set of batteries are replaceable.

According to an embodiment herein, the infrared remote control indicator 103 (as shown in FIG. 1A) is provided on the front fascia of the electronic foot pedal assembly 100. The infrared remote control indicator 103 is automatically switched ON in case of a wireless connection between the electronic foot pedal assembly 100 and the computing device. The infrared remote control indicator further indicates that the electronic foot pedal assembly 100 is operated wirelessly.

According to an embodiment herein, at-least two battery power indicators 104 (as shown in FIG. 1A) are provided on the front fascia of the electronic foot pedal assembly for indicating the residual battery power condition of the electronic foot pedal 100. In case of wireless connection between the electronic foot pedal and the computing device, the battery panel supplies adequate power to the electronic foot pedal assembly 100. The first battery power indicator 104*a* indicates that the battery is full and the second power indicator light 104*b* indicates that the battery is low. The second power indicator 104*b* reminds the user to change the battery or charge the battery in time (For Example: The first power indicator turns green when the battery is full. The second power indicator turns red when the battery is low).

According to an embodiment herein, the power switch 107 (as shown in FIG. 1C) is provided on the electronic foot pedal assembly 100 for switching ON/OFF of the battery panel 106. The power switch 107 is used only in case of wireless connection between the electronic foot pedal assembly 100 and the computing device. The power switch 107 comprises a soft touch button on the outer surface of the electronic foot pedal assembly 100. The power switch 107 is switched ON for activating the battery panel and is switched OFF for deactivating the battery panel 106. As soon as the power switch 107 is switched OFF, the battery panel 106 stops supplying electrical power to the electronic foot pedal assembly 100. As a result, the electronic feet pedal assembly 100 stops functioning.

Figure 2:
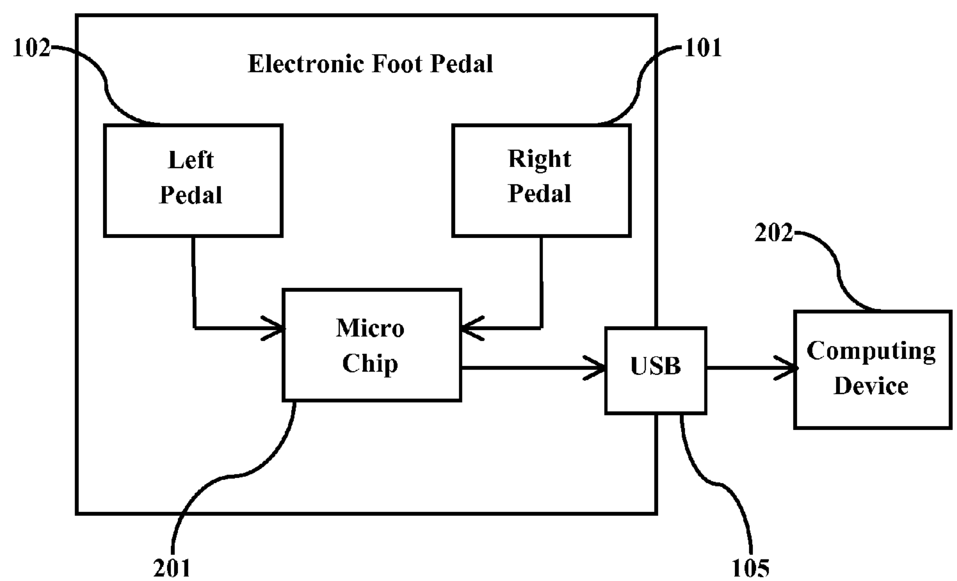
FIG. 2 illustrates a block circuit diagram of an electronic foot pedal connected to a computing device in a wired manner, according to an embodiment herein.

FIG. 2 illustrates a block diagram of an electronic foot pedal assembly connected to a computing device in a wired, according to an embodiment herein. The electronic foot pedal assembly is provided with the universal serial bus (USB) socket 105. The USB socket 105 provides the wired connection between the electronic foot pedal assembly and the computing device 202. The internal structure of the electronic foot pedal assembly comprises a micro chip 201. The left foot pedal 102 and the right foot pedal 101 are internally connected to the micro chip 201. When the musical instrument player stamps the left foot pedal 102 or the right foot pedal 101, the micro chip 201 connected to the foot pedals generates a command signal due to the stamping action. The micro chip 201 encodes the generated command signal based on the operation of the left foot pedal 102 and the right foot pedal 101. The encoded command signal is transmitted to the computing device 202 through the universal serial bus (USB) socket 105.

According to an embodiment herein, the electronic foot pedal driver software is pre-installed in the computing device 202 for enabling an electronic communication between the electronic foot pedal assembly and the computing device 202.

According to an embodiment herein, the image viewer software is pre-installed in the computing device 202 for viewing and turning the pages containing musical scores/notes in the computing device 202. If the right foot pedal 101 is stamped, the computing device 202 opens the next page of the musical scores/notes in the digital musical scores/notes file and similarly, in case the left foot pedal 102 is stamped, the computing device 202 opens the previous page of the musical scores/notes in the digital musical scores/notes file.

Figure 3:
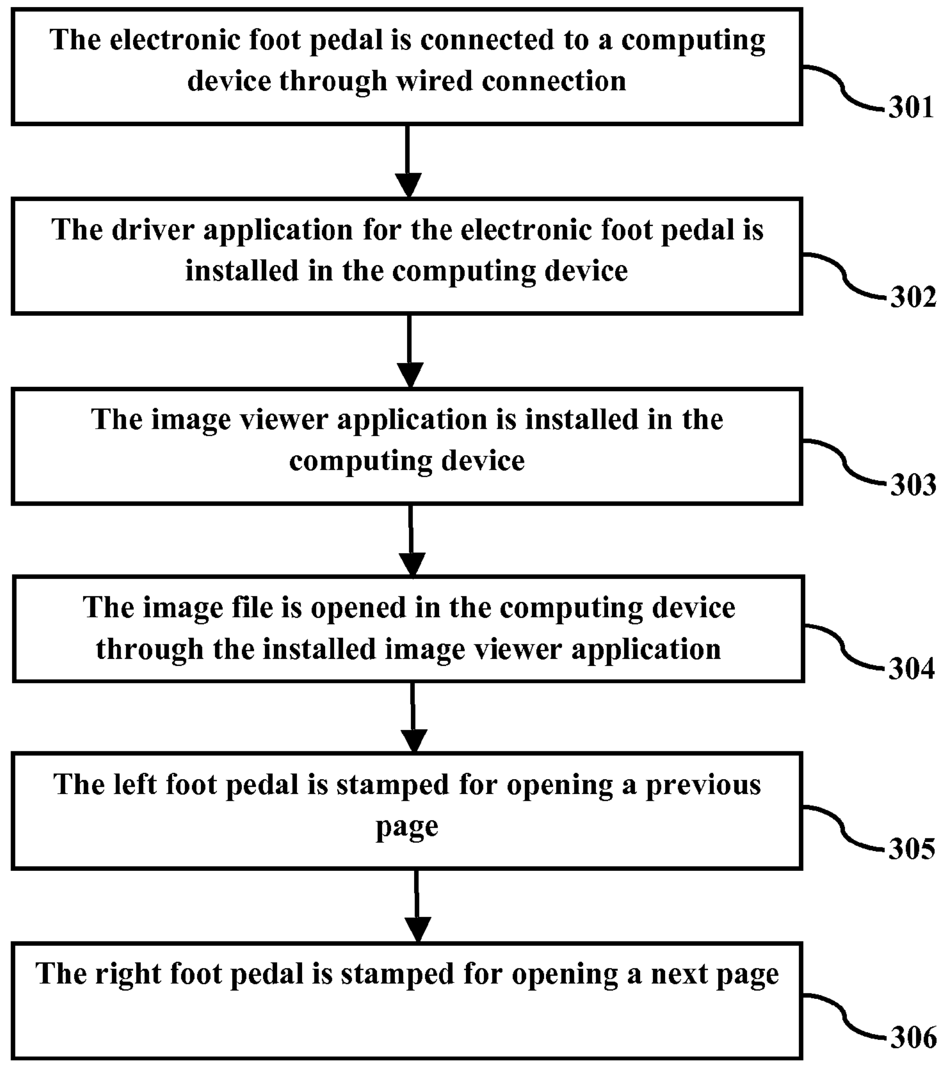
FIG. 3 illustrates a flow chart indicating a process of turning the pages in the digital music scores using an electronic foot pedal assembly connected to the computing device in a wired manner, according to an embodiment herein.

FIG. 3 illustrates a flow chart indicating a process of turning the pages in the digital music scores files in a computing device when the electronic foot pedal is connected to a computing device through wire, according to an embodiment herein. The universal serial bus (USB) socket provides a wired connection between the electronic foot pedal and the computing device (301). The electronic foot pedal driver software is pre-installed in the computing device for enabling an electronic communication between the electronic foot pedal and the computing device (302). The image viewer software is pre-installed in the computing device for viewing and changing the pages of musical scores/notes in the digital musical score file (303). The digital musical score file containing the musical scores/notes is downloaded and installed in the computing device. The file containing music scores/notes is opened in the computing device with the help of a mouse or touch screen etc and viewed using the pre-installed image viewer application (304). The musical scores/notes are preferably in the form of an image. The right foot pedal of the electronic foot pedal is stamped for opening the next page of musical scores/notes in the digital musical scores/notes file in the computing device (305). The left foot pedal of the electronic foot pedal is stamped for opening the previous page of musical scores/notes in the digital musical scores/notes file in the computing device (306). (For Example: A musical instrument player is facilitated to use the computing device (a Desktop Computer, a Laptop, a Tablet or Smart Phone etc) for viewing the musical scores/notes in the computing device instead of paper music scores. The electronic foot pedal is placed near or under the foot of the musical instrument player. The computing device and the electronic foot pedal are connected through USB socket (wired connection). The electronic foot pedal driver software is pre-installed in the computing device. The image viewer software (For Example: the image viewer called OVERTURE) is installed in the computing device for opening the pages of the musical scores/notes in the digital musical score file in the computing device. The OVERTURE software puts a number of music scores/notes in a single file, no matter how long or how many pages the music is. The OVERTURE software is opened using a mouse connected to the computing device or through a touch screen in the computing device, if the computing device is any of a Smart phones, a Tablet, etc. The right foot pedal of the electronic foot pedal is stamped for opening the next page of musical scores/notes in the digital musical score file in the computing device. The left foot pedal of the electronic foot pedal is stamped for opening the previous page of musical scores/notes in the digital musical score file in the computing device).

Figure 4:
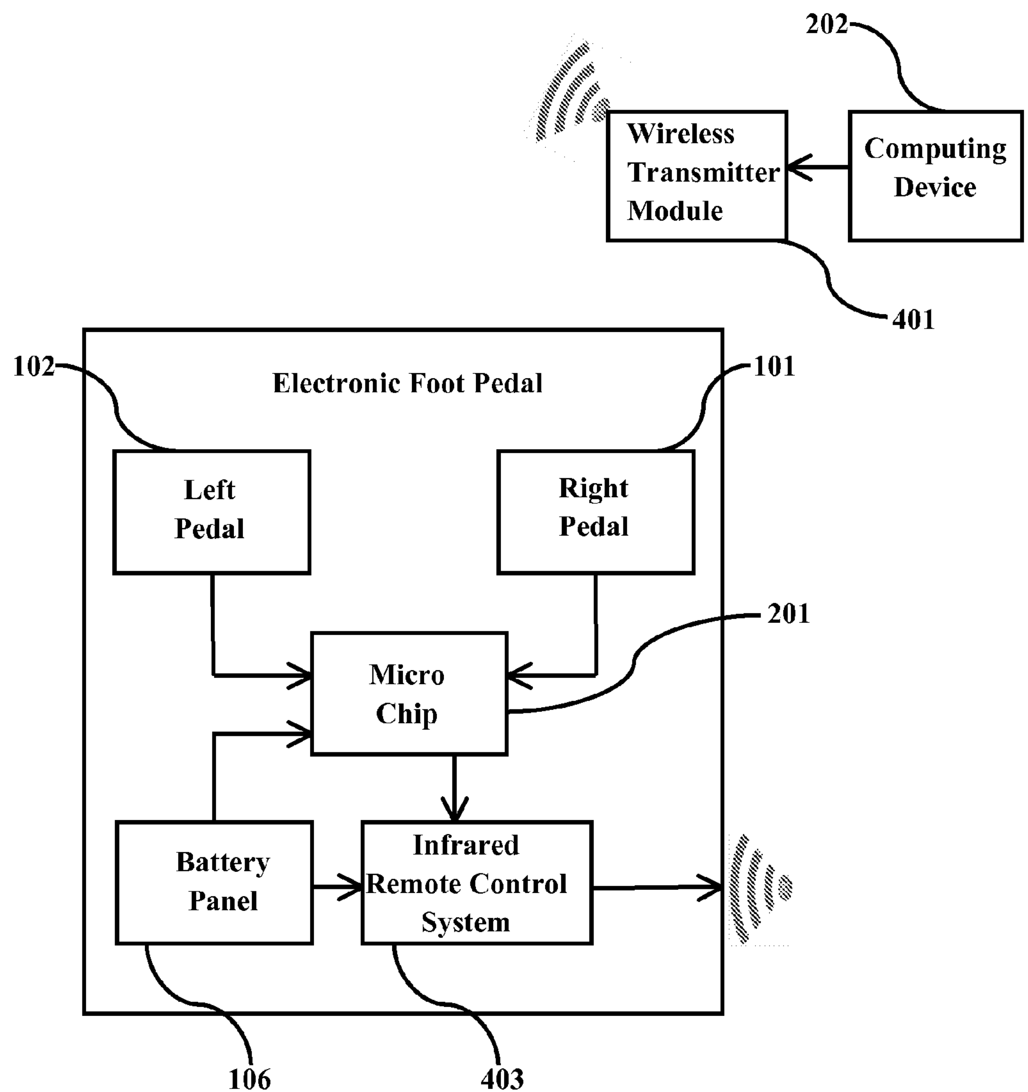
FIG. 4 illustrates a block circuit diagram of an electronic foot pedal connected to a computing device in a wireless manner, according to an embodiment herein.

FIG. 4 illustrates a block diagram of an electronic foot pedal assembly connected to the computing device in a wireless manner according to an embodiment herein. The internal structure of the wireless electronic foot pedal assembly comprises a microchip 201 and an infrared remote control system 403. The left foot pedal 102 and the right foot pedal 101 are internally connected to the microchip 201. The infrared remote control system 403 transmits an encoded command signal from the electronic foot pedal assembly to the computing device 202 wirelessly. The computing device 202 is further connected to a wireless transceiver module 401 to receive the encoded command signals transmitted from the infrared remote control system 403 of the electronic foot pedal assembly.

The battery panel 106 of the electronic foot pedal assembly provides an adequate electrical power supply required to operate the foot pedals in case of wireless connection between the electronic foot pedal assembly and the computing device 202. The battery panel 106 comprises a set of batteries connected in series. The power switch (not shown in FIG. 4) is switched ON and OFF to turn ON/OFF the battery panel 106. The battery panel 106 provides an adequate electrical power to the infrared remote control system 403 and the microchip 201 provided in the electronic foot pedal assembly. When the musical instrument player stamps the left foot pedal 102 or the right foot pedal 101, the microchip 201 connected to the foot pedals generates a command signal due to the stamping action. The microchip 201 encodes the generated command signal based on the operation of the left foot pedal 102 and the right foot pedal 101. The encoded command signal is transmitted to the infrared remote control system 403. The infrared remote control system 403 transmits the encoded signal to the wireless remote control system 401 connected to the computing device 202. The wireless remote control system 401 decodes the received encoded command signal and transmits command signal to the computing device 202.

According to an embodiment herein, the electronic foot pedal assembly further comprises a wireless mode indicator (not shown in FIG. 4). The wireless mode indicator is automatically switched ON when there is a wireless connection established between the electronic foot pedal and the computing device 202. The wireless mode indicator indicates that the electronic foot pedal assembly is been operated wirelessly. The electronic foot pedal assembly is provided with at-least two battery power indicators (not shown in FIG. 4). The battery power indicators are automatically switched ON in case of wireless connection. The battery power indicators indicate the residual battery power condition.

Figure 5:
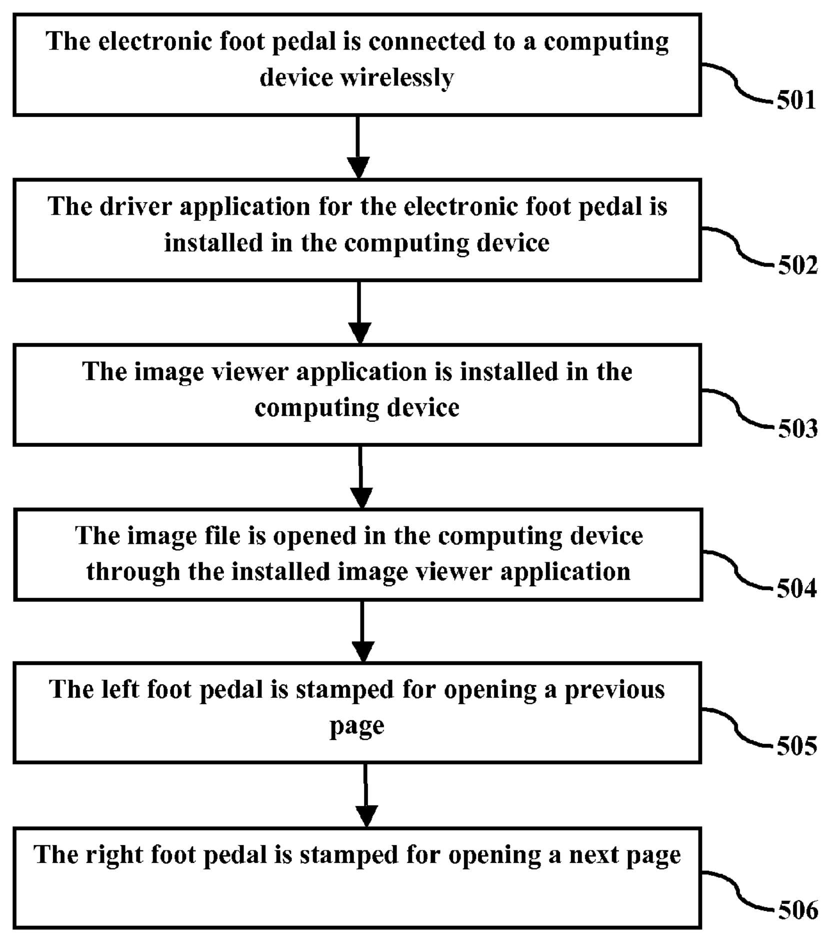
FIG. 5 illustrates a flow chart indicating a process of turning the pages in the digital music scores using an electronic foot pedal assembly connected to a computing device wirelessly, according to an embodiment herein.

FIG. 5 illustrates a flow chart indicating a process of turning the pages in the digital music scores files in a computing device when the electronic foot pedal assembly is connected to a computing device wirelessly, according to an embodiment herein. The power switch of the electronic foot pedal is switched ON to turn ON the batter panel. The battery panel provides the adequate power supply to the microchip and the infrared remote control system of the electronic foot pedal assembly. The infrared remote control system provides a wireless connection between the electronic foot pedal assembly and the computing device (501). The electronic foot pedal driver application is pre-installed in the computing device for providing an electronic communication between the electronic foot pedal assembly and the computing device (502).

The image viewer application is pre-installed in the computing device for viewing and turning the pages of musical scores/notes in the digital musical score file in the computing device (503). The digital musical score file containing the musical scores/notes is downloaded and installed in the computing device. The file containing music scores/notes is opened in the computing device with the help of a mouse or touch screen etc and viewed using the pre-installed image viewer application (504). The musical scores/notes are preferably in the form of an image. The right foot pedal of the electronic foot pedal assembly is stamped for opening the next page of the musical scores/notes in the digital musical scores/notes file in the computing device (505). The left foot pedal of the electronic foot pedal assembly is stamped for opening the previous page of musical scores/notes in the digital musical scores/notes file in the computing device (506). (For Example: A musical instrument player is facilitated to use the computing device (a Desktop Computer, a Laptop, a Tablet or Smart Phone etc) for viewing the musical scores/notes in the computing device instead of paper music scores. The electronic foot pedal is placed near or under the foot of the musical instrument player. The computing device and the electronic foot pedal assembly are connected through the infrared remote control system (wireless connection). The electronic foot pedal driver application is pre-installed in the computing device. The image viewer application (For Example: the image viewer application called OVERTURE) is installed in the computing device for opening the pages of the musical scores/notes in the digital musical score file in the computing device. The OVERTURE application puts a number of music scores/notes in a single file, no matter how long or how many pages the music is. The OVERTURE application is opened using a mouse connected to the computing device or through a touch screen in the computing device, when the computing device is any one of a Smart phone, a Tablet, etc. The right foot pedal of the electronic foot pedal assembly is stamped for opening the next page of musical scores/notes in the digital musical score file in the computing device. The left foot pedal of the electronic foot pedal assembly is stamped for opening the previous page of musical scores/notes in the digital musical score file in the computing device).

The electronic foot pedal assembly of the embodiments herein provides a method and system for turning the pages in the digital music scores files in a computing device. The electronic foot pedal assembly of the embodiments herein is connected to the computing device either through wired connection or wireless connection. The electronic foot pedal assembly of the embodiments herein avoids the musical instrument player to stop/pause playing the instrument when turning the pages containing music scores/notes in the digital music scores files in a computing device. The electronic foot pedal assembly of the embodiments herein facilitates the musician to view the digital music scores thereby allowing him to play or practice the music continuously and smoothly.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

Although the embodiments herein are described with various specific embodiments, it will be obvious for a person skilled in the art to practice the invention with modifications. However, all such modifications are deemed to be within the scope of the claims.

What is claimed is:

1. A method for turning pages of musical scores in a digital musical score file in a computing device using an electronic foot pedal assembly, the method comprises: installing a driver application for an electronic foot pedal in a computing device; installing an image viewer application in the computing device;

downloading and installing a digital musical score on the computing device; opening the installed digital musical score file in the computing device;

stamping the left foot pedal for opening a previous page of musical scores in a digital musical score file;

stamping the right foot pedal for opening a next page of musical scores in a digital musical score file; and stamping the left foot pedal continuously for opening a home page of musical scores in a digital musical score.

2. The method according to claim 1, wherein the image viewer application reads an image file formats in the digital score file.

3. The method according to claim 1, wherein digital image file has a format selected from a group of consisting of an Overture (OVE) file, a Joint Photographic format (JPG) file, a Tagged Image File (TIF) file, a Graphics Interchange Format (GIF) file, a Portable Network Graphics Format (PNG) file and a Camera RAW file.

* * * * *